United States Patent [19]

Harper-Tervet et al.

[11] Patent Number: 4,925,721
[45] Date of Patent: May 15, 1990

[54] HONEYCOMB SANDWICH STRUCTURE HAVING DISSIMILAR METAL FACE SHEETS

[75] Inventors: Jan Harper-Tervet, Palmdale; Rod F. Simenz, Sherman Oaks; James C. George, Los Angeles, all of Calif.

[73] Assignee: Lockheed Corporation, Calabasas, Calif.

[21] Appl. No.: 644,755

[22] Filed: Aug. 27, 1984

[51] Int. Cl.⁵ .............................................. B32B 3/12
[52] U.S. Cl. ..................................................... 428/116
[58] Field of Search ........................................... 428/116

[56] References Cited

U.S. PATENT DOCUMENTS

| | | | |
|---|---|---|---|
| 3,600,249 | 8/1971 | Jackson et al. | 428/116 X |
| 3,811,997 | 5/1974 | Yuan | 428/116 |
| 3,939,024 | 2/1976 | Hoggatt | 428/252 X |
| 4,249,976 | 2/1981 | Hudson | 428/116 X |
| 4,284,443 | 8/1981 | Hilton | 428/116 X |

*Primary Examiner*—Peter A. Nelson
*Attorney, Agent, or Firm*—Louis L. Dachs

[57] ABSTRACT

The invention is a honeycomb structure suitable for use with cryogenic materials. In detail, the invention comprises a honeycomb sandwich structure 10 having a titanium core 14, a first face sheet 12 made of aluminum alloy suitable for high-temperature applications, and a second face sheet 16 made of titanium bonded together by a high-temperature thermoplastic adhesive. Preferably the core 14 is made of Ti-15V-3Cr-3Sn-3 aluminum, Ti-6Al-4V and/or Ti-3Al-2.5V. The first face sheet 12 is, preferably, made out of Al-8Fe-7Ce, Al-13Fe-4.6V, Al-10Fe-1Mo1V and Al-6Fe-6Ni-2Cr or other aluminum alloys suitable for use at temperatures in excess of 600° F. The second face sheet 16 is, preferably, made of Ti-6Al-4V, Ti-6Al-2Sn-4Zr-2Mo or Ti-15V-3Cr-3Sn-3Al. Preferably, the adhesive 18a, 18b is a thermoplastic material such as polyetheretherketone, polyphenylquinoxaline or a polyamide-imide. The bond line may incorporate fiberglass sheets to ensure there is no galvanic action between the titanium core and the aluminum face sheet and to maintain a consistant thickness bond.

3 Claims, 1 Drawing Sheet

HONEYCOMB SANDWICH STRUCTURE HAVING DISSIMILAR METAL FACE SHEETS

TECHNICAL FIELD

The invention relates to the field of structural materials and, in particular, to a honeycomb structural material for use as a cryogenic tank wall.

BACKGROUND ART

Titanium alloys, although difficult to machine and fabricate, have been used successfully in ships, aircraft, and spacecraft in sheet, forged, and cast forms. One of the most notable examples of the use of titanium alloys can be found in the the SR-71 reconnaissance aircraft, formerly manufactured by the Lockheed Corporation. Titanium alloys offer high strength at elevated temperatures and a high modulus-to-density ratio. Titanium honeycomb sandwich structures, where both the face sheets and core are titanium, have particularly found wide acceptance in the aircraft industry, offering high stiffnessto-weight ratios provide by honeycomb structure, in general, as well as structural integrity at high temperatures in the 500° to 600° F. range.

Prior art methods of fabricating honeycomb structures have made use of diffusion bonding techniques. While diffusion bonding provides an excellent joint between the core and face sheets, it is an expensive process to use, requiring high pressures, extremely clean surfaces which are free of oxides, and the bonding process must be performed in a vacuum or, at least, in an inert atmosphere. Braising and welding are other techniques which have been successfully used to join the face sheets to the core. Organic adhesives have also been used, but elevated temperature performance is severely limited by the inability of conventional adhesives to withstand high temperatures.

Unfortunately, titanium is subjected to hydrogen embrittlement when exposed to hydrogen in either a gas or liquid form. Thus, if titanium is to be used at all in such application, a barrier must be provided between the hydrogen and titanium structure. In the past, this requirement has all but eliminated the use of titanium in applications of the nature described. The concept of using a coating over the titanium structure is an obvious solution, but there is danger of the coating becoming penetrated, and separate physical barriers add weight. Therefore, its use in hydrogen-fuel tankage has heretofore not been practical.

A load-carrying material, such as aluminum which is not susceptible to hydrogen embrittlement, integral with the titanium structure, would be ideal. But it was not thought possible to make liquid, hydrogen-fuel tankage for aircraft, space vehicles, etc., made of a honeycomb sandwich structure wherein the second face sheet is titanium bonded to a titanium honeycomb core to absorb the high temperatures, with the opposite first face sheet being of an aluminum alloy to act as a barrier between the titanium and the hydrogen using an organic adhesive. This was because of the fact that aluminum has a much higher thermal expansion coefficient than titanium and that raising the second face sheet to 600° F. and above while the first (aluminum) face sheet was at temperatures below 400° F. would put too much stress on the adhesive, let alone finding an adhesive that could withstand 600° F. without degradation.

Therefore, it is a primary object of the subject invention to provide a honeycomb structure that is light in weight and compatible with cryogenic materials such as hydrogen fuel.

It is a further object of the subject invention to provide an adhesively bonded honeycomb sandwich structure that is capable of exposure to extremely low temperatures on the aluminum face sheet and extremely high temperatures on the titanium side without inducing unacceptable thermal stresses.

It is still a further object of the subject invention to provide an adhesively bonded honeycomb sandwich structure comprising a titanium core with a second face sheet of titanium and a first face sheet of aluminum alloy such that the structure can be used as a wall of a tank for storing cryogenic materials such as liquid hydrogen propellant.

DISCLOSURE OF INVENTION

The invention is a honeycomb structure suitable for use with liquid or gaseous cryogenic materials. In detail, the invention comprises a honeycomb sandwich structure having a titanium core, a second face sheet of titanium alloy sheet and a first face sheet of aluminum alloy suitable for high-temperature applications, bonded together by a high-temperature thermoplastic adhesive. Preferably the core is made of Ti-15V-3Cr-3Sn-3 Al, Ti-6Al-4V or Ti-3Al-2.5V. The first (aluminum) face sheet is, preferably, made out of Al-8Fe-7Ce, Al-13Fe-4.6V, Al-10Fe-1Mo1V and Al-6Fe-6Ni-2Cr or other aluminum alloys suitable for use at temperatures in excess of 600° F. The first (titanium) face sheet is, preferably, made of Ti-6Al-4V, Ti-6Al-2Sn-4Zr-2Mo or Ti-15V-3Cr-3Sn-3Al. Preferably, the adhesive is a thermoplastic material such as polyetheretherketone, polyphenylquinoxaline or a polyamide-imide. The bond line may incorporate fiberglass sheets to ensure an even thickness bond line and also to prevent any possible galvanic acton occurring between the titanium core and the aluminium face sheet.

The novel features which are believed to be characteristic to the invention, both as to its organization and method of operation, together with further objects and advantages thereof, will be better understood from the following description connected with the accompanying drawings in which presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1 is a perspective view of the honeycomb structure partially broken away to show the interior thereof.

Illustrated in FIG. 2 is an exploded side-elevation view of the honeycomb structure showing the layers of materials prior to joining.

Figure 3:
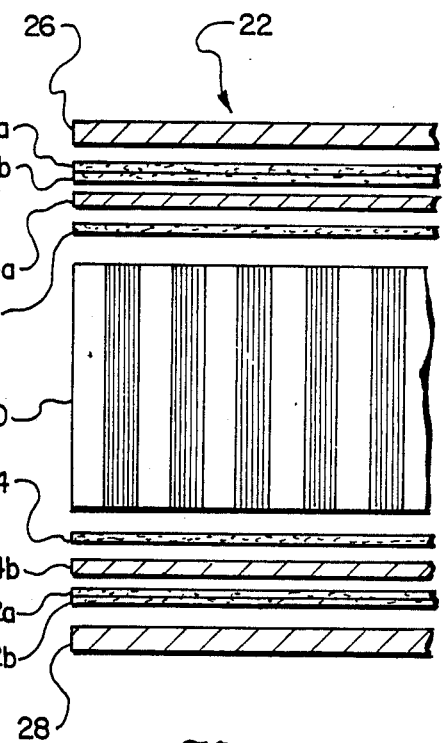

Illustrated in FIG. 3 is an exploded side-elevation view of a second embodiment honeycomb structure showing the layers of materials prior to joining.

BEST MODE FOR CARRYING OUT THE INVENTION

Figure 1:
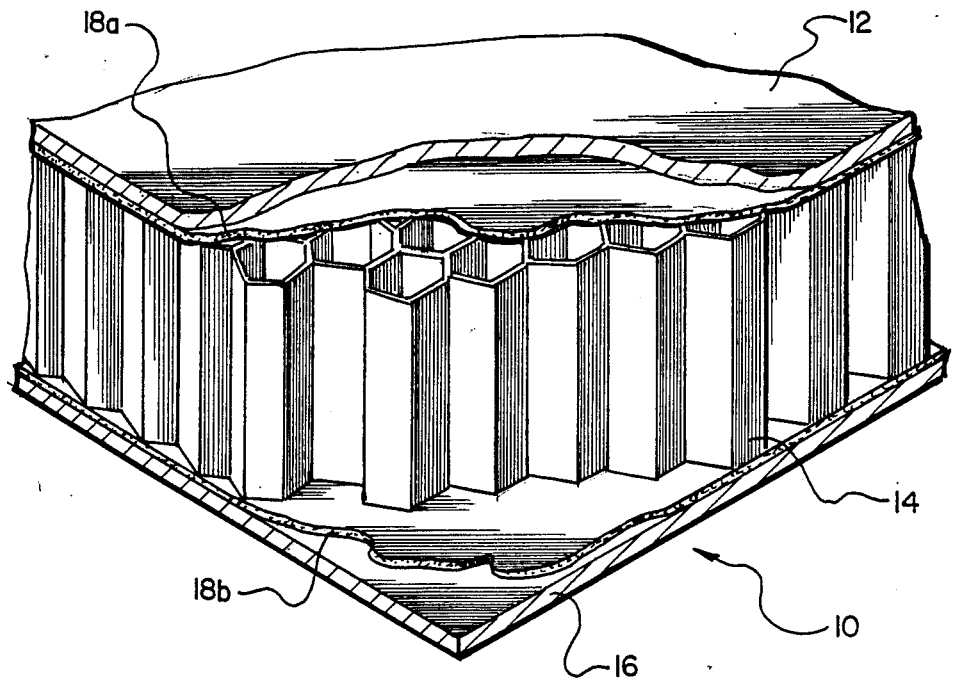
Figure 2:
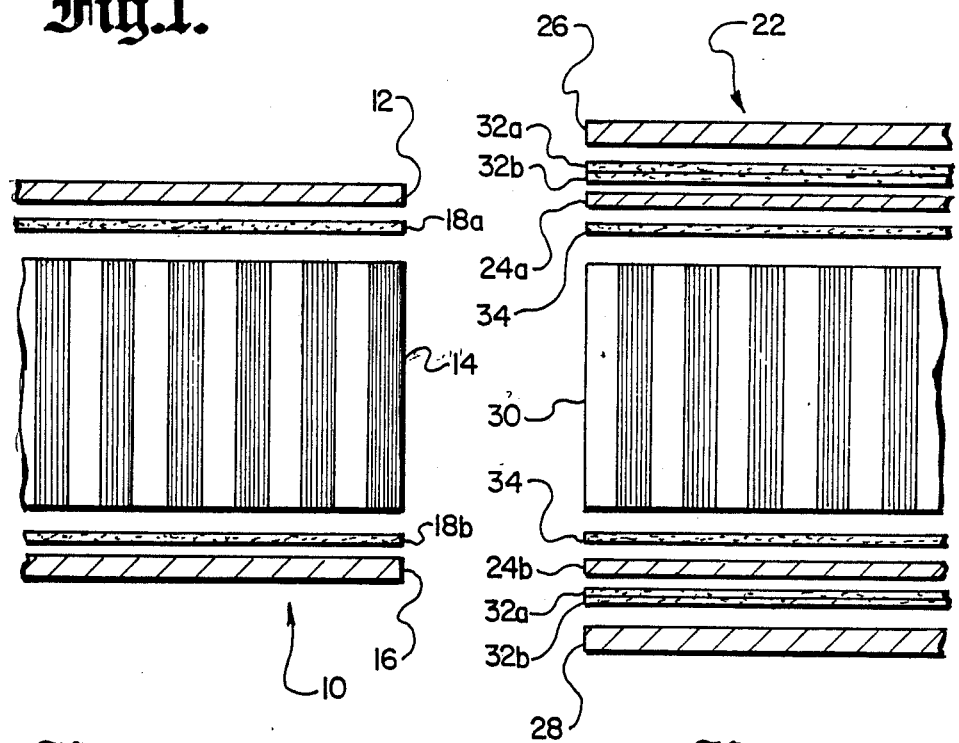

Referring to FIGS. 1 and 2, it can be seen that the honeycomb sandwich, structure, generally designated by numeral 10, comprises an aluminum alloy first face sheet 12, a titanium alloy core 14, and a titanium alloy second face sheet 16 bonded together by thermoplastic adhesive layers 18a and 18b. The aluminum alloy first face sheet 12 is selected from a family of aluminum alloys that can withstand exceedingly high temperatures, above the 600° F. level on an operational basis and, further, exposure to temperatures as high as 800° F. without undue loss of mechanical properties upon return to room temperature. For example, Al-8Fe-7Ce, Al-13Fe-4.6V, Al-10Fe-1Mo-1V, and Al-6Fe-6Ni-2Cr are highly suitable in this application. Suitable titanium alloys for use as the second face sheet 16 are Ti-6Al-4V, Ti-6Al-2Sn-4Zr-2Mo and Ti-15V-3Cr-3Sn-3Al. AS for the titanium alloy core 14, Ti-15V-3Cr-3Sn-3Al, Ti-6Al-4V, and Ti-3Al-2.5V have been found suitable.

The real breakthrough here has been the discovery of an adhesive suitable for use in such a honeycomb sandwich structure, i.e., one that can be exposed to such high-differential temperatures and, particularly, one that is capable of operating in a 600° F. temperature environment. It was known that thermoplastic materials used as matrix material in organic matrix composites, such as Victrex (which is a polyetheretherketone thermoplastic), manufactured by ICI Industries, Welivyn Garden City, Hertfordshire, England, was useable at temperature above 600° F., PPQ-2501, manufactured by King-Mar Labs, Encinatas, which is a polyphenylquinoxaline, K-resin, manufacture by DuPont Corp., Wilmington, Delaware and PAI, manufactured by Amaco Corp., Naperville, Illinois, which is a polyamide-imide, are also matrix materials useable in the 600° F. range. It was discovered that if these materials were fabricated in a film material, they could be used as an adhesive to make all metal honeycomb sandwich structures.

Thermoplastic materials differ from thermosetting materials previously used in such applications in that with the latter, an actual chemical change occurs when heated to a temperature above the melting point (cure temperature), the high strength occurring after return to room temperature. With thermoplastic materials, no chemical change occurs, the high strength being the inherant in the materials at formulation.

Up until the development of these matrix materials into an adhesive sheet and the recent development of the aluminum alloys which can withstand the high temperatures, it was not possible to make the subject composite structure. First of all, the adhesive (matrix material) must be heated to between 725° and 800° F. in order to reach a melting point, allowing the adhesive to coat both adherents and "set" as the temperature is reduced. Conventional aluminum alloys could not be heated to such high temperatures without a significant degradation in roomtemperature performance nor could they operate for long periods of time when exposed to temperatures as high as 600° F.

Additionally, there is a problem that is encountered due to the differential expansion of the aluminum and titanium as the temperature is raised between 725° and 800° F., i.e., the aluminum will elongate much more than the titanium. Thus, upon cooling down to 500° F. (wherein the adhesive sets or solidifies), extremely high stresses can be induced into the adhesive upon cooling (to −423° F. for liquid hydrogen). While a temperature drop of some 225° to 300° is experienced before the adhesive starts to set (which significantly reduces the differential thermal expansion), conventional adhesives cannot absorb such changes in temperature. For example, even in the direct bonding of titanium sheet to aluminum sheet at temperatures in the 250° F. range, joint strength is significantly reduced because of the stresses induced by differential contraction upon cooling.

A typical fabrication procedure is as follows:

1. The aluminum face sheet is prepared for bonding by a procedure typically comprising an alkaline cleaning followed by an acid etch with water rinsing between and after the above steps. There are numerous commercially available processes that can be used.

2. The titanium face sheet is prepared for bonding by a procedure typically comprising the steps of sandblasting and then alkaline peroxide cleaning per the procedure disclosed in assignees' co-pending patent application Ser. No. 346,168, "Pre-Bond Surface Treatment for Titanium" by A. Rogers, et al. February 5, 1982 there are numerous other commercially available cleaning procedures which are useable.

3. The first and second face sheets and honeycomb core with adhesive sheets are assembled and placed in a furnace.

4. A low pressure of 3 to 5 psi load is applied. Optionally, the furnace can be a vacuum type and the pressure is applied by means of a dead weight.

5. The temperature is raised to between 725° and 800° F. for sufficient time for the adhesive to melt 6. The temperature is then reduced to approximately 500° F. allowing the thermoplastic adhesive to solidify.

7. The honeycomb sandwich structure is then brought down to room temperature.

Illustrated in FIG. 3 is an alternate embodiment of the honeycomb sandwich structure, generally designated by numeral 22, wherein layers of fiberglass cloth 24a and 24b are placed between the aluminum alloy first face sheet 26 and the second titanium alloy face sheet 28 and the honeycomb core 30. Two layers 32a and 32b of adhesive are placed between the fiberglass cloth 24a and 24b and face sheets, and one layer 34 of adhesive is placed between the fiberglass cloth and core 30. It should be noted that the use of multiple layers of adhesive is dependent upon the total thickness of adhesive required and it is not a necessity to use multiple layers. The material preparation and bonding procedure are identical to that previously disclosed. The fiberglass acts as the holder of the melted adhesive and tends to produce a more consistent thickness bond line. The fiberglass cloth also prevents any possibility of direct contact between the core and the aluminum face sheet, eliminating the possibility of any corrision developing due to intimate contact of dissimilar metals.

While the honeycomb sandwich structure has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The honeycomb sandwich structure has application on structures exposed to hydrogen gas or liquid or other cryogenic liquids.

We claim:

1. A honeycomb sandwich structure comprising:
an aluminum alloy first face sheet, said aluminum alloy being of the type that can accomodate immediate exposure to temperatures of up to 800° F.

without significant degradation of structural properties upon return to room temperature;

a titanium alloy honeycomb core, having first and second opposed principle surfaces;

a titanium alloy second face sheet; and a layer of thermoplastic as an adhesive joining said first and second face sheets to said first and second opposed principle surfaces of said core, said adhesive having an operational temperature in excess of 600° F.

2. The structure as set forth in claim 1 wherein said layer of adhesive contains a sheet of fiberglass therein separating said face sheets from said first and second opposed principle surfaces of said core.

3. The structure as set forth in claims 1 or 2 wherein the adhesive is selected from the group consisting of polyetheretherketone, polyphenylquinoxaline, and polyamide-imides.

* * * * *